(12) United States Patent
Favalora

(10) Patent No.: US 6,487,020 B1
(45) Date of Patent: Nov. 26, 2002

(54) VOLUMETRIC THREE-DIMENSIONAL DISPLAY ARCHITECTURE

(75) Inventor: Gregg E. Favalora, Cambridge, MA (US)

(73) Assignee: Actuality Systems, INC, Cambridge, MA (US)

( * ) Notice: Subject to any disclaimer, the term of this patent is extended or adjusted under 35 U.S.C. 154(b) by 0 days.

(21) Appl. No.: 09/404,046

(22) Filed: Sep. 23, 1999

Related U.S. Application Data

(60) Provisional application No. 60/101,617, filed on Sep. 24, 1998.

(51) Int. Cl.[7] .......................... G02B 27/10; G03B 21/56
(52) U.S. Cl. ........................................ 359/619; 359/443
(58) Field of Search ................. 359/619, 479, 359/470, 462, 623, 463, 443, 455, 475; 345/100

(56) References Cited

U.S. PATENT DOCUMENTS

| | | | |
|---|---|---|---|
| 4,082,446 A * | 4/1978 | Driscll et al. | |
| 4,082,447 A | 4/1978 | Pascuzzi | 355/30 |
| 4,160,973 A | 7/1979 | Berlin, Jr. | 340/718 |
| 4,853,769 A | 8/1989 | Kolin | |
| 4,922,336 A * | 5/1990 | Morton | 348/51 |
| 5,082,350 A | 1/1992 | Garcia et al. | 359/478 |
| 5,148,310 A * | 9/1992 | Batchko | 359/479 |
| 5,172,251 A | 12/1992 | Benton et al. | 359/9 |
| 5,349,419 A * | 9/1994 | Taguchi | 355/22 |
| 5,418,632 A * | 5/1995 | Anderson | 359/17 |
| 5,543,874 A * | 8/1996 | Winnek | 354/112 |
| 5,606,455 A * | 2/1997 | Eichenlaub | 359/462 |
| 5,663,740 A * | 9/1997 | Brotz | 345/31 |
| 5,703,717 A | 12/1997 | Ezra et al. | |
| 5,712,732 A | 1/1998 | Street | 359/630 |
| 5,754,147 A * | 5/1998 | Tsao et al. | 345/6 |
| 5,808,792 A | 9/1998 | Woodgate et al. | |
| 5,828,495 A | 10/1998 | Schindler | 359/621 |
| 5,880,887 A | 3/1999 | Goto | 359/626 |
| 5,926,319 A * | 7/1999 | Phillips et al. | 359/620 |
| 5,966,167 A | 10/1999 | Nose et al. | |
| 6,064,423 A * | 5/2000 | Geng | 348/36 |
| 6,115,006 A | 9/2000 | Brotz | 345/6 |
| 6,261,402 B1 | 7/2001 | Watanabe et al. | 156/230 |
| 6,302,542 B1 * | 10/2001 | Tsao | 353/7 |

OTHER PUBLICATIONS

Fisher et al., "Stereoscopic Displays and Virtual Reality Systems IV" *Proceedings of SPIE* 3012:167–174 (1997).
Batchko, "Three–hundred–sixty degree electro–holographic stereogram and volumetric display system", *SPIE*, vol. 2176:30–41 (1994).

* cited by examiner

*Primary Examiner*—Georgia Epps
*Assistant Examiner*—Saeed Seyrafi
(74) *Attorney, Agent, or Firm*—Fish & Richardson P.C.

(57) ABSTRACT

A display system including a lenticular screen; a support assembly movably supporting the lenticular screen; and a drive mechanism which during operation causes the lenticular screen to repeatedly sweep through a volume of space.

26 Claims, 7 Drawing Sheets

VOLUMETRIC THREE-DIMENSIONAL DISPLAY ARCHITECTURE

CROSS-REFERENCE TO RELATED APPLICATIONS

This application claims the benefit of Provisional Application Serial No. 60/101,617, filed Sep. 24, 1998.

BACKGROUND OF THE INVENTION

The invention relates generally to electronic display technology and more specifically to volumetric three-dimensional displays.

It is known that it is possible to create a three-dimensional image by illuminating a rotating two-dimensional surface. A series of points or trajectories (i.e., vectors) is displayed by controlling the time-varying illumination of a projection surface. As the projection surface sweeps out a 3-D volume, many points in the 3-D volume can be illuminated. Due to the persistence of human vision, if a point is repeatedly illuminated for a brief interval with a repetition period of no more than $1/20$ second, the point appears to be illuminated without flickering. Thus, by illuminating a display screen which undergoes rapid periodic motion to sweep out a volume of space, a true volume-filling (i.e., volumetric) 3-D display can be achieved.

One such system is described by Ketchpel (U.S. Pat. No. 3,140,415). His system utilizes a phosphorescent rotating screen that is illuminated by a fixed electron gun. His approach, however, is characterized by "dead zone" regions which are not addressable or accessible by the illumination source. For example, when the angle between the screen's plane and the impinging illumination beam is small, it is difficult to draw imagery of high detail. In such regions, the imaging volume has picture elements (i.e., voxels) that are plagued with low spatial accuracy.

Schwarz and Blundell attempted to solve this problem by using a similar phosphorescent screen system and illuminating it with two electron guns, each responsible for illuminating the screen during different angular segments (*IEEE Proc.—Optoelectron.*, Vol. 141, No. 5, October 1994, pp. 336–344). This helps eliminate the dead zone but requires duplicate illumination, computation, and aiming systems and circuitry.

In contrast, Batchko (U.S. Pat. No. 5,148,310) employs a single illumination source, which shines onto a rapidly moving scanning system. In his system, the scanning system is positioned to always illuminate the rotating screen from a direction nearly perpendicular to the screen. His approach, which requires the spinning of a set of mirrors at least one of which is an off-axis mirror, helps reduce the scanning dead zone. Also, his system, like the systems of Ketchpel, Schwarz and Blundell, and many others, is a vector-based scanning system which employs a computationally intensive technology that is known to flicker when drawing complex imagery.

Tsao et al. (U.S. Pat. No. 5,754,147) disclose a volumetric display which, like the Batchko technology, attaches an off-axis mirror to the rotating display unit. They describe a display that is made of three subunits, namely, an optical data generator, an optical interfacing unit, and a rotating unit with display means. Their optical data unit includes an image projector whose generated images are projected into a complex of coaxially rotating mirrors. The mirrors rotate at a different speed than the rotating display screen. They relay light to another mirror, which rotates off-axis with the display screen at approximately 10 Hz. Their optical interfacing unit includes 5 to 10 miniature mirrors.

Garcia Jr., et al (U.S. Pat. No. 5,042,909) employed a rotating screen illuminated by vector-scanned laser light. As their screen rotates, a system of computer-controlled scanners steers laser light onto it. This technique exhibits some of the same characteristics of vector-based displays. For instance, only a low percentage of the addressable volume may be used in a given image.

Favalora (U.S. Pat. No. 5,936,767, entitled "Multiplanar Autostereoscopic Imaging System," and incorporated herein by reference) discloses a raster-based imaging system that is computationally simpler than the vector scanned systems and uses fewer moving parts than some of the systems described above.

For a 3-D display to remain economically feasible, it is desirable that it not require the use of coherent light (i.e., laser illumination). Laser light is presumably used in most of the above-mentioned 3-D displays because it is easy to focus coherent light onto the rotating image plane. In contrast, the Tsao et al. system allows for the use of incoherent light but at the expense of mechanical complexity and decreased brightness in the resulting image. A method of using inexpensive incoherent illumination is disclosed in Morton's "Three dimensional display system," (U.S. Pat. No. 4,922,336). Morton also discloses the use of an anamorphic lens which rotates coaxially with a helical projection screen so that the illumination is always focused onto the appropriate locations of the screen. However, Morton also uses as his image generator a "projection CRT display." Typical projection CRTs are slow (e.g. on the order of 60 Hz refresh).

The above-mentioned volumetric 3-D displays provide imagery with nearly every depth cue, most notably convergence (i.e., the viewer's eyes rotate inwards as a function of nearness) and accommodation (i.e., the viewer's lenses focus farther as function of depth). However, all known multiplanar, 3-D displays, including those described above, have been unable to render imagery which exhibits occlusion (i.e., the tendency of objects in the foreground to block those in the background). This is because the illuminated regions are naturally transparent. The resulting imagery possesses a ghost-like transparent quality which prevents the viewer from enjoying the occlusion of objects placed in front of each other.

SUMMARY OF THE INVENTION

For only one viewer, occlusion is produced in the displayed image by providing the rendering software with knowledge of the viewer's position. If the rendering software that computes the image slices that are to be displayed is capable of hidden surface removal, it can render a view appropriate for the viewer's position. The position information may be input manually or acquired with existing head-tracking or eye-tracking systems. However, for any additional viewer located at another position different from the first viewer's position, the imagery will appear confusing because the occlusion will be incorrect. Although steps can be taken to lightly render the "hidden surfaces," the effect will still be incomplete.

Generally, it is desired that multiple users be able to use the 3-D display simultaneously. It is also desired that the "viewer tracking" be done implicitly without active head-tracking equipment, which tends to be slow and expensive. At the same time, the 3-D display must continue to provide cues for convergence and accommodation.

In general, in one aspect, the invention is a display system including a lenticular screen; a support assembly movably supporting the lenticular screen; and a drive mechanism which during operation causes the lenticular screen to repeatedly sweep through a volume of space.

Preferred embodiments may include one or more of the following features. The lenticular screen is helical in shape and includes an array of cylindrically-shaped lens elements or spherically-shaped lens elements, or some combination thereof. The array is an M by N array. The support assembly defines an axis of rotation for the screen. The screen has an axis of symmetry and is mounted in the support assembly with axis of rotation and the axis of symmetry being collinear. The drive mechanism during operation rotates the screen continually about the axis of rotation. The lenticular screen is translucent. The screen is made up of an array of lenticular elements and a sheet of material having a back surface and a front surface, wherein the array of lenticular elements is on only the front surface. The back surface of the sheet of material is smooth.

In general, in another aspect, the invention is a lenticular screen that is translucent and helical in shape.

In general, in yet another aspect, the invention is a volumetric display including ganged SLMs within the image generator. The ganged SLMs are operated sequentially, each one handling a different projected image slice.

Systems embodying the invention exhibit one or more of the following advantages in comparison to prior art systems. They provide a 3-D display which can exhibit the occlusion of imagery using variable transparency, for one viewer and for multiple viewers. They can provide realistic imagery which does not suffer from constant transparency. They are economical and do not require cumbersome reflective scanning means which rotate quickly with respect to the display unit. They do not include a large number of fixed beam-steering optics to ensure that the illumination reaches the final scanning member. They provide a 3-D display with a minimum of moving mechanical elements. They do not use duplicate illumination sources, which require additional computational effort and hardware to support. They do not require coherent illumination, which is can be costly and dangerous. They do not use screen geometries which introduce significant dark regions known as dead zones. They do not require specialized and expensive computational systems. They can provide multicolor imagery without undue cost. In addition, they allow a design flexibility in the which the screen can either be used in a "projection screen" mode, such as a diffusive surface, or a "non-projection screen" mode, such as a mirror which redirects light from an internal imagery source.

Other advantages and features will become apparent from the following description of the preferred embodiments and from the claims.

DESCRIPTION OF THE PREFERRED EMBODIMENTS

Figure 1:
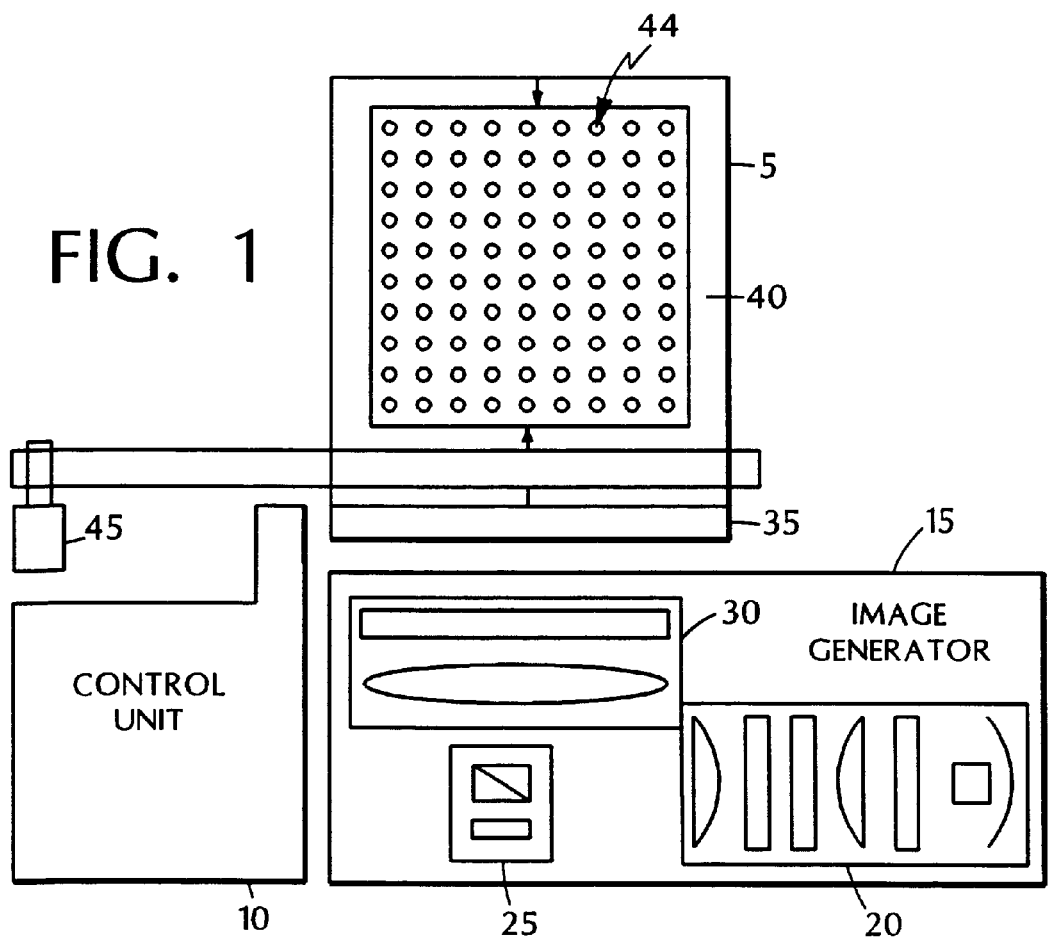
FIG. 1 shows the key components of a generalized volumetric display embodying the invention.

An illustrative embodiment of a volumetric display is shown in FIG. 1. A planar, rectangular lenticular screen 40 inside a viewport 5 undergoes periodic motion during which it repeatedly sweeps out a volume of space. A control unit 10 monitors the orientation of screen 40 and instructs an image generator 15 to project imagery into the viewport and onto screen 40. The screen's periodic motion is sufficiently frequent to enable a viewer (or viewers) to perceive volume-filling 3-D imagery.

A variety of components and structures may play the roles of viewport 5, control unit 10, and image generator 15. Considerations of cost and use will typically dictate the resolution, type, precision, and mode of manufacture of these units. In the illustrated embodiment, screen 40 is mounted so that its axis of symmetry coincides with an axis of rotation and a motor 45 sets screen 40 into rapid rotation at approximately 20 revolutions per second about the axis of rotation. Control unit 10 senses the angular position and frequency of the screen and sends image data to image generator 15.

Inside image generator 15, an illumination unit 20 illuminates a spatial light modulator (SLM) 25 which directs reflected light up towards projection optics 30. SLM 25 is a two-dimensional array of light control elements each of which either reflects impinging light from illumination unit 20 or allows that light to pass through depending upon signals applied to the SLM. In other words, SLM 25 reflects an image towards projection optics 30 corresponding to the data supplied by the control unit. In the described embodiment, the illumination source is non-collimated and incoherent, so the projection optics also include elements that provide a sharp focus on the screen as well as an arrangement of mirrors 35 which maintain a fixed relationship with the screen and are designed to project the image onto the screen.

The projection system used in the described embodiment is similar to others used in the prior art. The reader is referred to the prior art for additional details. See, for example, "New Display Gives Realistic 3-D Effect," Aviation Week, Oct. 31, 1960, pp. 66–67.

Given the appropriate data, lighting conditions, and control electronics, the viewer or viewers will be able to see volume-filling imagery in the viewport 5 from nearly any angle. And because the screen is a lenticular screen, images can be generated which show the appropriate occlusion for different viewing angles.

The volumetric display system can use image-redirection optics, such as a rotating dove prism or K-mirror, to rotate the image at the same speed as the rotating screen and thereby generate a stationary image on the screen. Or alternatively, the image data fed to the image generator may be rotated computationally by the control unit. Either approach allows each image frame (many of which are drawn per update, e.g. 256) to be projected with the correct orientation and scaling with respect to the viewing screen 40. If the latter approach is used, the computational transformation can be performed quickly, especially if precomputed lookup tables are used. The rendering and display techniques for accomplishing this are known in the art. Thus, such techniques will not be described here but rather the reader is referred to existing readily available public sources providing such details.

Lenticular screen 40 includes an array of lenticular lenses 44 on at least one of its surfaces. Lenticular screen 40 enables the image generator to project different imagery for different viewing angles. The array of lenticular lenses 44 enables viewers at different viewpoints to see different images. If properly registered imagery is projected onto the screen, the viewport will provide volume-filling imagery, which, as usual, provides correct perspective and parallax, and which also has variable transparency so that objects may occlude each other. This requires computing image data from several viewpoints for each projected frame. Though lenticular lenses and lens arrays are well known in the art, a brief description of how they work will be provided.

A more widely known embodiment of a lenticular lens array is a lenticular lens sheet. It includes a sheet with a plurality of adjacent, parallel, elongated, and partially cylindrical lenses and multiple (e.g. two) interleaved images on the sheet. In general, the plurality of lenses enables the multiple interleaved images to be displayed on the underlying sheet but only one of the images will be visible from any given vantage point above the sheet.

Figure 2:
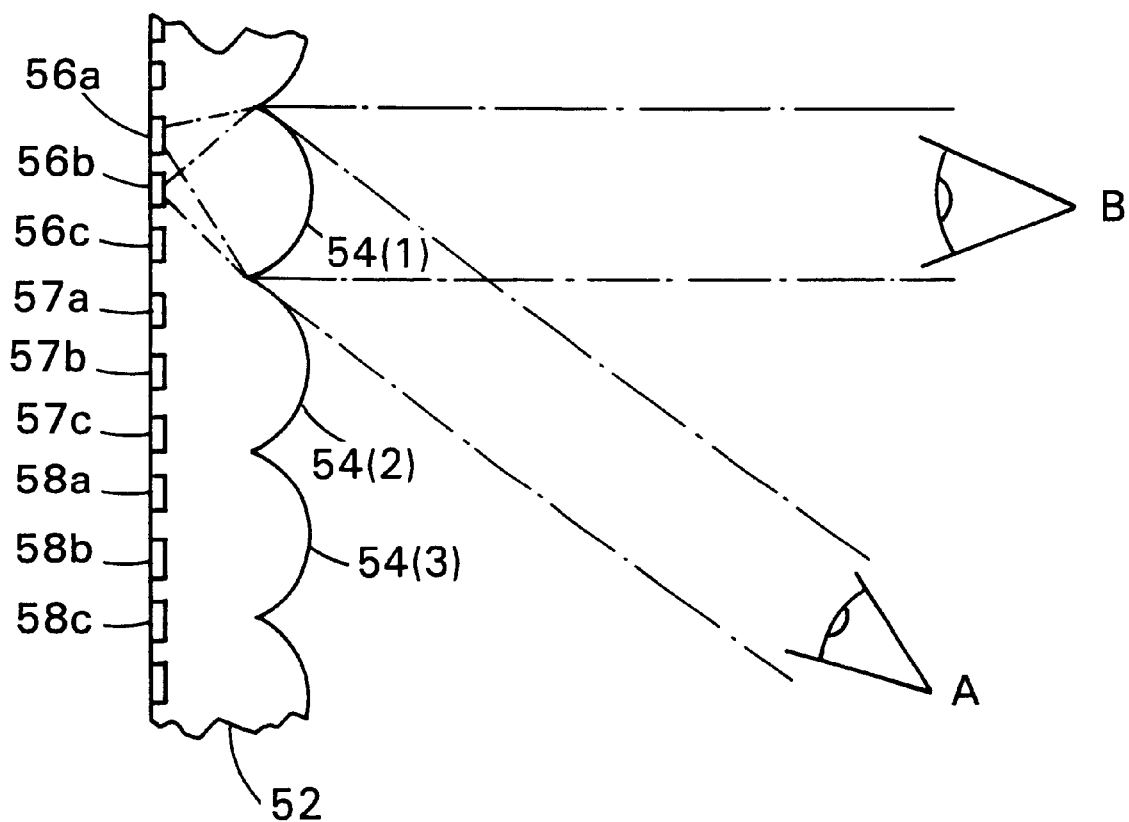
FIG. 2 is a schematic representation of a lenticular screen.

The underlying principle which explains this is illustrated in FIG. 2, which presents a schematic side view of a lenticular lens sheet 52 with a plurality of lens elements 54(1–3). The image on the underlying sheet is represented by pixels 56–58. In this example, three image pixels, identified by suffixes "a", "b", and "c", respectively, are shown under each lens element 54. Thus, for example, under lens element 54(1) there are three pixels, namely 56a, 56b, and 56c.

If a person views the sheet from location "A", lens element 54(1), because of its focusing ability, allows that person to only see light from pixel 56a. That is, of the light which lens element 54(1) collects, it only sends toward the person at location "A" that light which is collected from pixel element 56a. The rest of the light which lens element 54(1) collects from other locations under the lens is sent off in other directions and will not be seen by a person a location "A". For similar reasons, a person at location "B" only sees light emanating from pixel 56b, but does not see light emanating from other locations under lens element 54(1).

Now assume that all pixels Na make up a first image, all pixels Nb make up a second image, and all pixels Nc make up a third image (where N is an index identifying the particular lens location in the lenticular array). Then, a person at location "A" will see the first image but not the second and third images and a person at location "B" will see the second image but not the first and third images.

FIGS. 3A–D illustrate how the revolving lenticular display system works in accordance with the principles just described. It shows in schematic form, a lenticular display screen 71 with an array of lenses 73 on one surface. For this example, it is assumed that each lens is characterized by four viewing zones, labeled "1", "2", "3", and "4". Typically, each viewing zone illuminates a continuous angle. That is, a viewer positioned anywhere within that zone (e.g. zone 1) should be able to view the appropriate pixel associated with that zone, as previously described. Furthermore, while in any given viewing zone, the observer cannot see pixels associated with the other zones. In this example, screen 71 is rotating in a counterclockwise direction and as an observer at location 75 looks at the screen, zones 1–4 will pass by in that order.

Figure 3A:
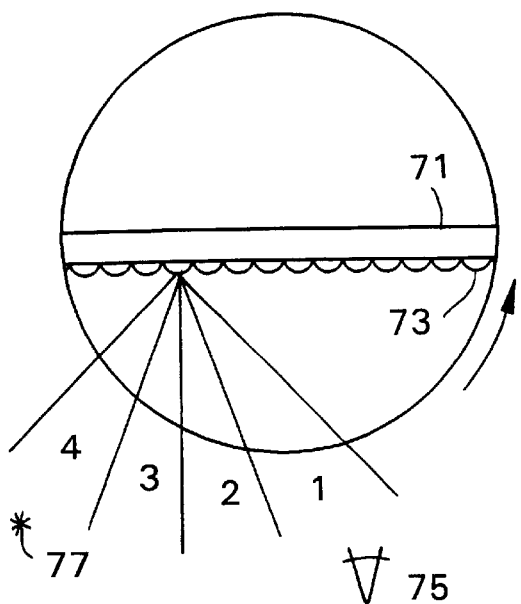
FIGS. 3A–D illustrate the operation of the lenticular display.
Figure 3B:
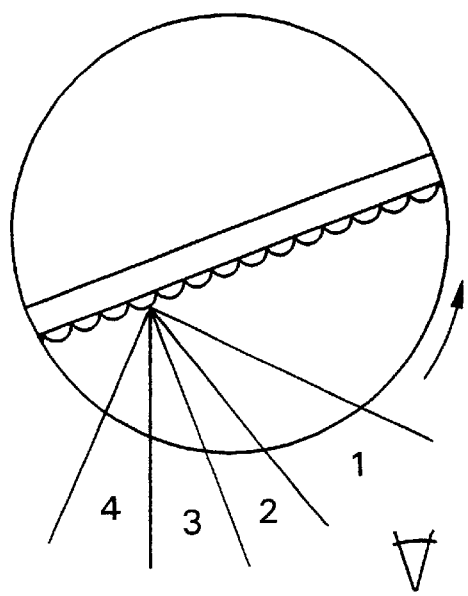
Figure 3C:
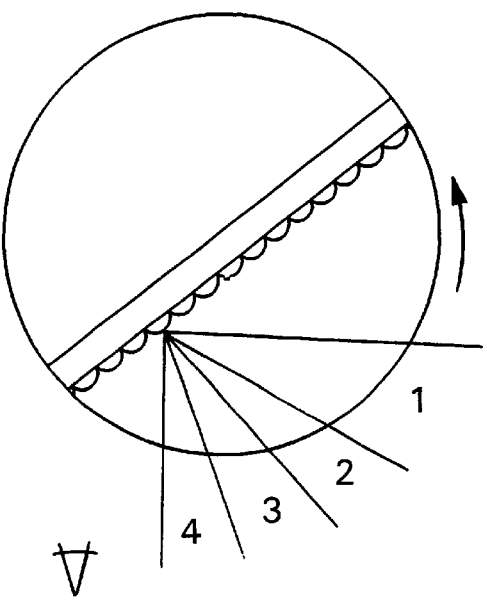

FIG. 3A illustrates one rotational position of the display screen in which the observer sees light for zone 1. It should be apparent that zone 1, like the other zones, represents a range of rotation during which the viewer sees the image information that is projected onto the locations on the screen that are visible in that zone. If we assume that a new image slice is projected onto the display screen every 1° of rotation and that each zone is 25° wide, then the observer at location 75 will see about 25 successive individual image slices when zone 1 sweeps by. Each new image slice is separated from the last one by an amount attributable to 1° of rotation of the screen.

For the observer at location 75 to see the correct occlusion, the image slices that the controller causes to be projected onto the pixels for zone 1 must be appropriately rendered for observation at the viewing position of observer 75. Notice however, that an observer at location 77, will be seeing images from zone 4 at the same time that the observer at location 75 is seeing images for zone 1. This implies that another set of images, rendered from the perspective of location 77, must be displayed on the pixels associated with zone 4 at the same time that the other images are being displayed for zone 1. Of course, neither observer will see the other images because of the selecting ability of the lenticular lenses. Also, since different pixel locations are being illuminated, these other image slices can be displayed concurrently with the image slices of the other perspectives.

Since in this example there are four zones, if we assume that all four perspectives must be available at the same time, then four sets of images must be displayed concurrently, a different set for each of the four pixel locations behind each lens.

Figure 3D:
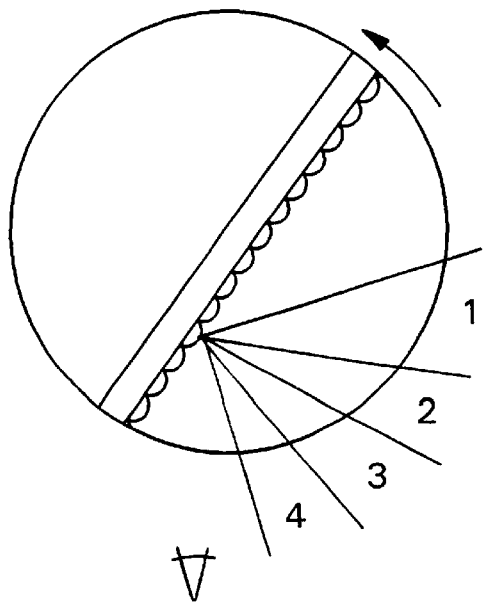

It should also be apparent that as the zones sweep by the observer at location 75, the perspective that is displayed in any given zone must be changed as that zone comes into view from a new perspective. Thus, when the screen is oriented as shown in FIG. 3D, the observer at location 75 is now viewing zone 4. Thus, the image slices that are projected onto the pixels associated with zone 4 during this period of rotation now have to reflect the perspective of location 75 and not the perspective of location 77 as they did in FIG. 3A.

As should be apparent from the above description, the number of image slices that are projected onto the screen during a rotation is unrelated to the number of viewing zones. For a reasonable resolution 3-D image, approximately 200 image slices need to be projected for viewers in 4 or more zones.

With this scheme, a viewer located anywhere should be able to see imagery for every rotational position of the screen. Moreover, the lenticular screen will be characterized by discrete viewing zones which "blend" into each other. That is, there should be no cutoff of perceived illumination between neighboring zones.

It should be pointed out that care must be taken to avoid the creation of large "dead zones". This can be accomplished a number of ways including using a lenticular array that is of sufficiently high quality so as to create a range of viewing zones which occupies 180° and using a screen that has a non-rectangular cross-section. Otherwise, imagery will only appear in two approximately half-cylindrical volumes on either side of the axis of rotation.

It should be understood that, as used herein, a "lenticular lens array" and a "lenticular screen" are meant to cover all embodiments of a lens element array which provide the type of directional selection of the underlying image information that was described above. Thus, for example, the lens elements can be cylindrically-shaped, as mentioned earlier, or they can be spherically-shaped so as to provide an image discrimination function in at least two orthogonal directions within a plane parallel to the plane of the array. In addition, the elements need not be conventional lens elements; they can be any optical element, including holographic optical elements, which provide the same type of functionality described above.

Lenticular screen 40 is made of a translucent material or at least a material that has a translucent backside surface which can be illuminated by the impinging light and the illuminated portion will be visible. The array of lenticular lens elements is on the front surface of the screen. The image light is projected onto the backside at the appropriate pixel locations. And the resulting images are viewed from the various viewing positions in front of the screen.

Though the described embodiment employs a planar, rectangular screen, other geometries can also be used. For example, the screen may have a planar circular shape or some other shape. In addition, there is no requirement that the screen have an axis of symmetry, or if it is does, that the axis of symmetry also be the axis of rotation. Furthermore, the motion imparted to the screen need not be strictly rotary. The only essential requirement is that the imparted motion cause the screen to repeatedly sweep out a fixed volume of space.

The screen could also have a more complex shape such as helical, as described elsewhere in the public literature. For example, see Morton (U.S. Pat. No. 4,922,336) which describes one type of helical screen that is "formed of a single turn of a constant radius spiral, such as a single turn of an 'Archimedes screw'". Other designs of the helical screen are, of course, also possible.

If a helical shape is utilized, then a multi-element anamorphic lens that helps achieve better focus would also be desirable. The design and construction of such as anamorphic lens is also generally known in the art. Again, see Morton who discloses the use of a co-rotating coaxial anamorphic lens to aid in focusing on his helical screen. His lens was made of many tiny elements, each of which is responsible for one voxel on the surface of the helical screen.

An alternative to the costly and somewhat complex multi-element lens is a holographic optical element (HOE), the design of which is also within the skill in the art. An HOE is designed to perform the function of the multi-element lens. And once constructed, the HOE can more easily be duplicated in a cost-effective manner in high volume. Moreover, the HOE may perform additional aspects besides beam steering, such as increasing resolution by steering light from ganged SLMs or other illumination sources.

Alternatively, the lenticular screen may be fashioned out of a collection of "directional slats," such as the striped metal pattern found covering traffic lights so that a car in a given lane can see the stop/go light intended only for that lane. A similar dense 2-D array of such slats can be created into a lenticular screen.

Most of the screen geometries that could be used in the lenticular display can also be improved by endowing them with a non-rectangular cross-section, as disclosed in U.S. Ser. No. 09/318,086, incorporated herein by reference. For example, the screen when viewed from the side can have a diamond-shaped cross-section, which will help eliminate the dark region formed wherever the viewer is looking at the edge of the projection screen.

Figure 4:
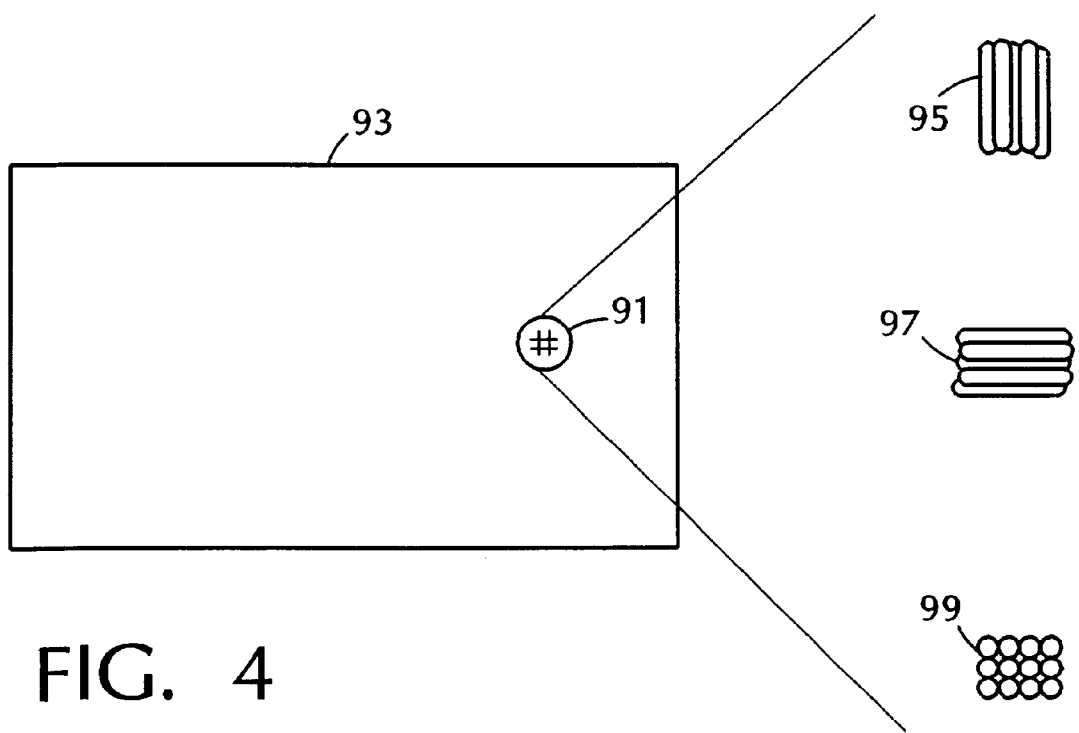
FIG. 4 illustrates various designs of lenticular lens elements.

As illustrated in FIG. 4, the lenticular lens elements 91 on lenticular screen 93 may be vertical, horizontal, spherical, or a combination of these. Or they may be implemented by a louver element as disclosed by Kollin's in U.S. Pat. No. 4,853,769, or by any other known means of barrier grids. Also, they may employ a holographic optical element (HOE) as disclosed by Trayner, D. J. and Orr, E., "Developments in autostereoscopic Displays using Holographic Optical Elements," in *Stereoscopic Displays and Virtual Reality Systems IV*, Scott S. Fisher, John O. Merritt, Mark T. Bolas, Editors, Proceedings of. SPIE Vol. 3012, 167–174 (1997).

The imagery intended for different viewing zones may be interleaved on a pixel-by-pixel basis. The 2-D display screen may be organized into a periodic structure of pixel groups, each of which is comprised of a pixel intended to be seen from a given viewing zone. Or, the 2-D display screen may be arranged in a series of vertical or horizontal alternating bands.

The pixels for each viewpoint may also be displayed in a time-varying manner. That is, if the directional shutter or lenticular screen has time-varying directional properties, such as that stipulated in Kollin's U.S. Pat. No. 4,853,769, the 2-D imagery may cycle in time through the viewpoint-specific illustrations. Or, there may be a combination of both—a time-varying series of illumination patterns which are also built out of direction-specific subpixels.

Figure 5:
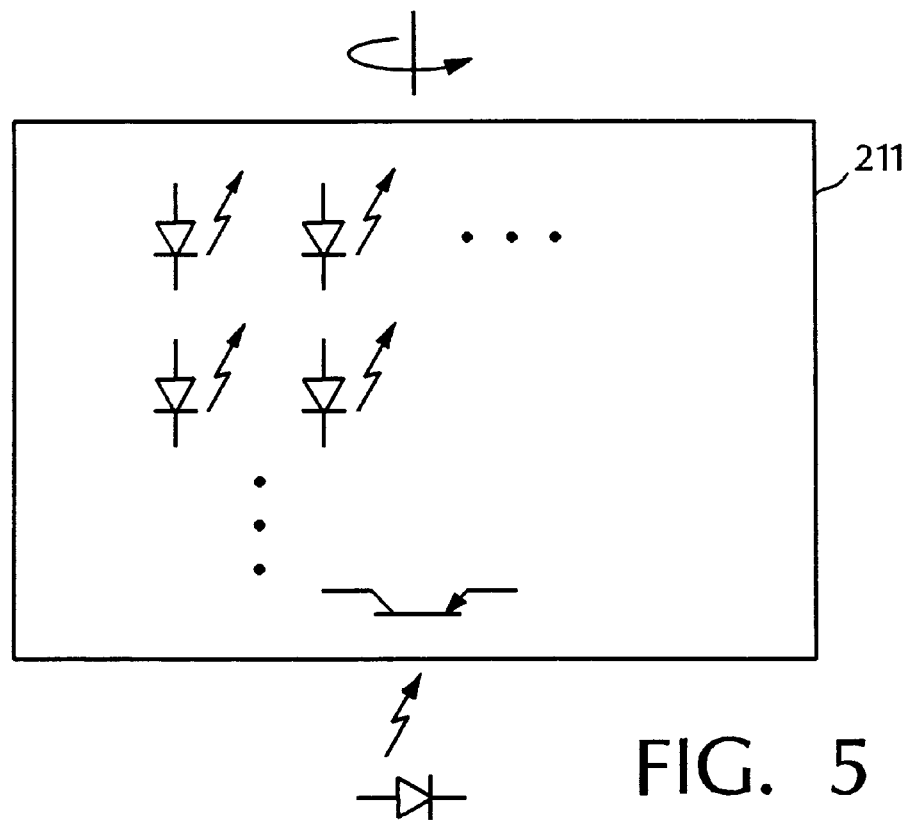
FIG. 5 shows a schematic representation of an emissive lenticular display.

It should also be understood that the lenticular or multi-viewzone swept display may also be an emissive display 211 such as a backlit LCD panel or a tight array of LEDs, as illustrated in FIG. 5. If the display is emissive (e.g. see U.S. Pat. No. 4,160,973), the illumination information needs to be passed into a rotating structure. This may be achieved using conductive brushes, capacitive coupling, RF signaling, or the use of phototransistors.

Figure 6:
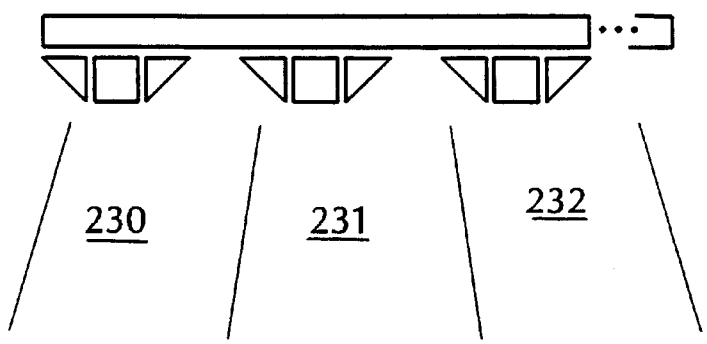
FIG. 6 shows an example of an emissive lenticular display in which the front lenses of the emissive elements include light directing portions.

Referring to FIG. 6, a further embodiment of an emissive, multi-viewzone swept display is a periodic structure of emissive element 213 whose front surfaces direct light in a small angle zones 230, 231, and 232. They may be LEDs or LCD pixels with elements attached to them, for example, or may be comprised of a tight bundle of fiber optic elements (e.g. see U.S. Pat. No. 5,082,350.).

Furthermore the swept lenticular screen displays described herein may be operated in modes which provide an arbitrary number of viewpoints limited only by the number of different viewing angles that are provided by the lenticular elements. Furthermore, if the display system is given information on the position of the viewers, it can operate in a mode which only provides imagery for those positions. Using that approach may be useful for increasing brightness and decreasing computational load.

Other embodiments of the image generator can provide increased resolution and allow for the use of lower cost components. For example, the image generator can employ multiple, buffered SLMs. While one unit is displaying an image slice onto the revolving screen, the other is receiving image data for the display of the next image slice. In other words, to increase the display's speed, several slow and/or low-resolution illumination sources (e.g. SLMs) are grouped together and used sequentially in a type of optical buffering arrangement. That is, by switching among the relatively slow SLMs, one can create imagery with higher resolution and high speed. Alternatively, several small but fast SLMs may be grouped together into an effectively large SLM with high resolution. Illustrative embodiments of this approach are shown in FIGS. 7A and 8A.

Figure 7A:
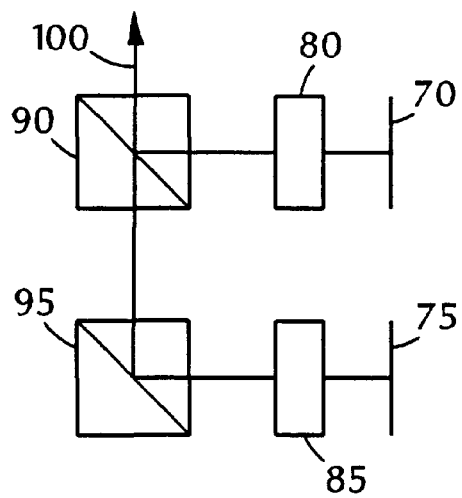
FIG. 7A shows a ganged arrangement of SLMs.

In the arrangement shown in FIG. 7A, two (or more) SLMs are ganged together. More specifically, SLM 70 and SLM 75, both of which are illuminated by an illumination source that is not shown, handle alternate 2-D slices of the final 3-D image that is projected on the revolving display screen. Optical shutters 80 and 85 sequentially pass light from the SLMs to corresponding beam combining optics 90 and 95 (e.g. beam splitters). The passed light at any moment is in image beam 100.

Figure 7B:
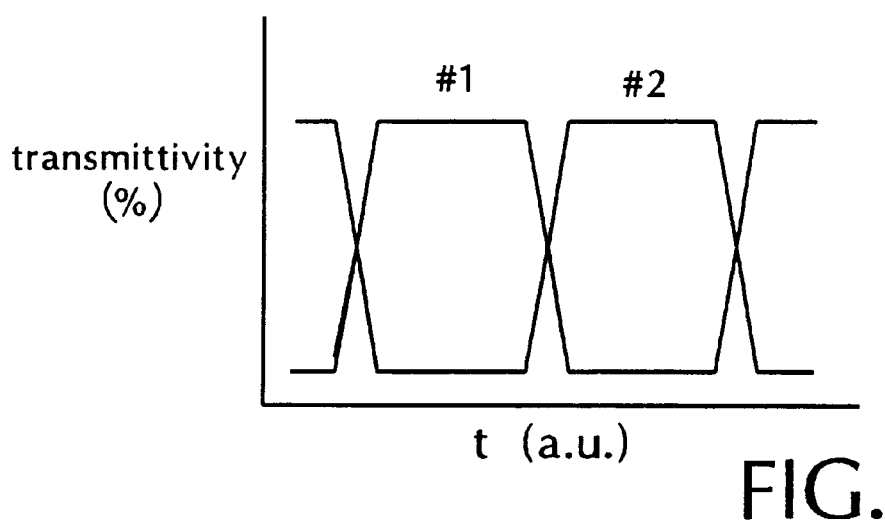
FIG. 7B shows waveforms for the transmissivities of the optical shutters used in the arrangement of FIG. 7A.

FIG. 7B shows two waveforms representing typical % transmissivities as a function of time for the two optical shutters 80 and 85. Waveform #1 is for optical shutter 80 and waveform #2 is for optical shutter 85. Ganging together portions of or the entirety of one or more 1- or 2-D SLMs (or, for that matter, other light emitters or modulators) can result in a higher resolution than would ordinarily be available from single, slow modulators or emitters. Of course, as is known to persons skilled in the art, one can also add filters, color wheels, and multicolor light sources to create multicolor imagery.

Figure 8A:
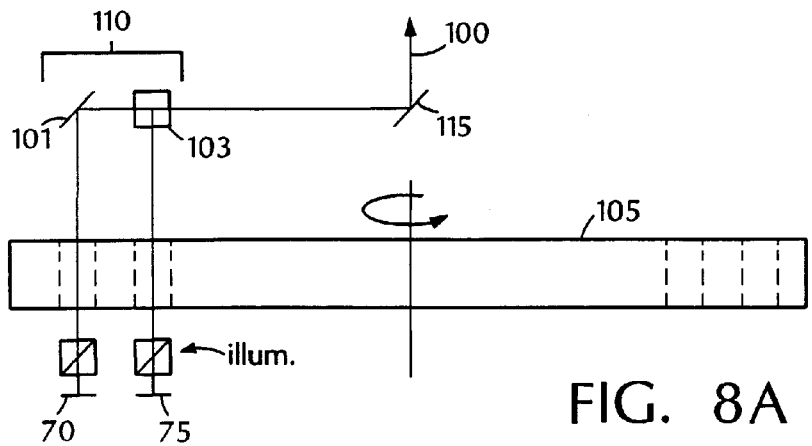
FIGS. 8A–C show mechanical shutter systems for selecting which SLM provides the projected image.
Figure 8B:
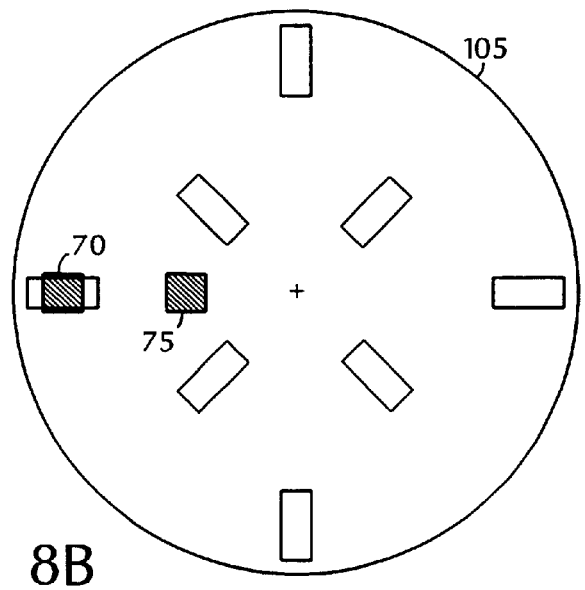

FIG. 8A illustrates another embodiment which improves upon the ganged SLM concept, at least in terms of cost. It uses a slotted rotating disk 105 to perform the optical shuttering. This will decrease both system cost and complexity, especially if the rotating shutter is connected physically to the rotating screen.

In the embodiment of FIG. 8A, one or more SLMs or light sources 70 and 75 are loaded with appropriate image data from the control unit. Typically, the images are sequential slices of the light to be projected onto the rotating screen. The slotted rotating shutter 105 allows light from the SLMs to pass through sequentially, through an optical relay 110 (typically one or more mirrors 101 and beam-combining optics 103) towards a final mirror 115 which shuttles the imagery 100 toward the final projection optics and the rotating screen.

To ease manufacture and ensure high operating stability, the rotating shutter can be physically connected to the other rotating components.

Figure 8C:
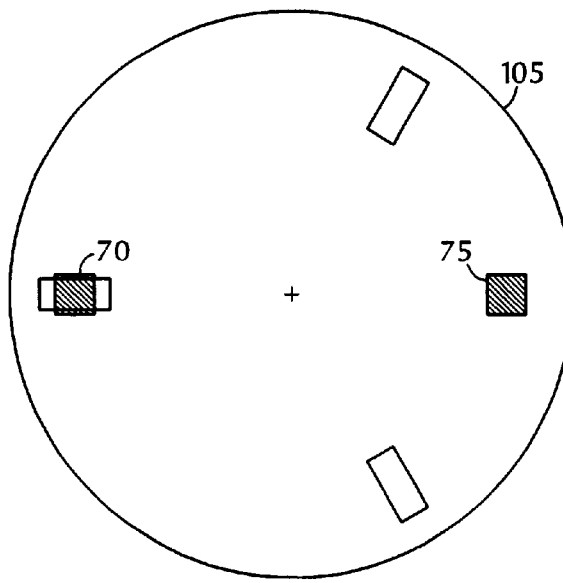

The shutter may be constructed of a variety of punched holes, inset lenses, slits, or other appropriate elements. The shutter action may be incorporated into the HOE which ordinarily would be performing helical focusing tasks. The SLMs or light sources may be on the same, opposite, or other locations relative to the axis of rotation (as illustrated in FIG. 8C). For example, if 256 slots are punched into the rotating disk, it may rotate at the same speed as the projection screen and HOE to provide 256 slices through the 3-D volume. If fewer slots are used than there are image slices, then the shutter disk must rotate more frequently than the projection screen.

Of course, different geometries can be used other than a slotted flat disk. For instance, it might be easier to construct a circular plate with an outer vertical, slotted wall around its perimeter. The slots on the vertical wall gate images from SLMs located outside of and parallel to the wall. The gated images are sent to an optical assembly located within the plate and that optical assembly redirects the images to the lenticular screen.

Figure 9:
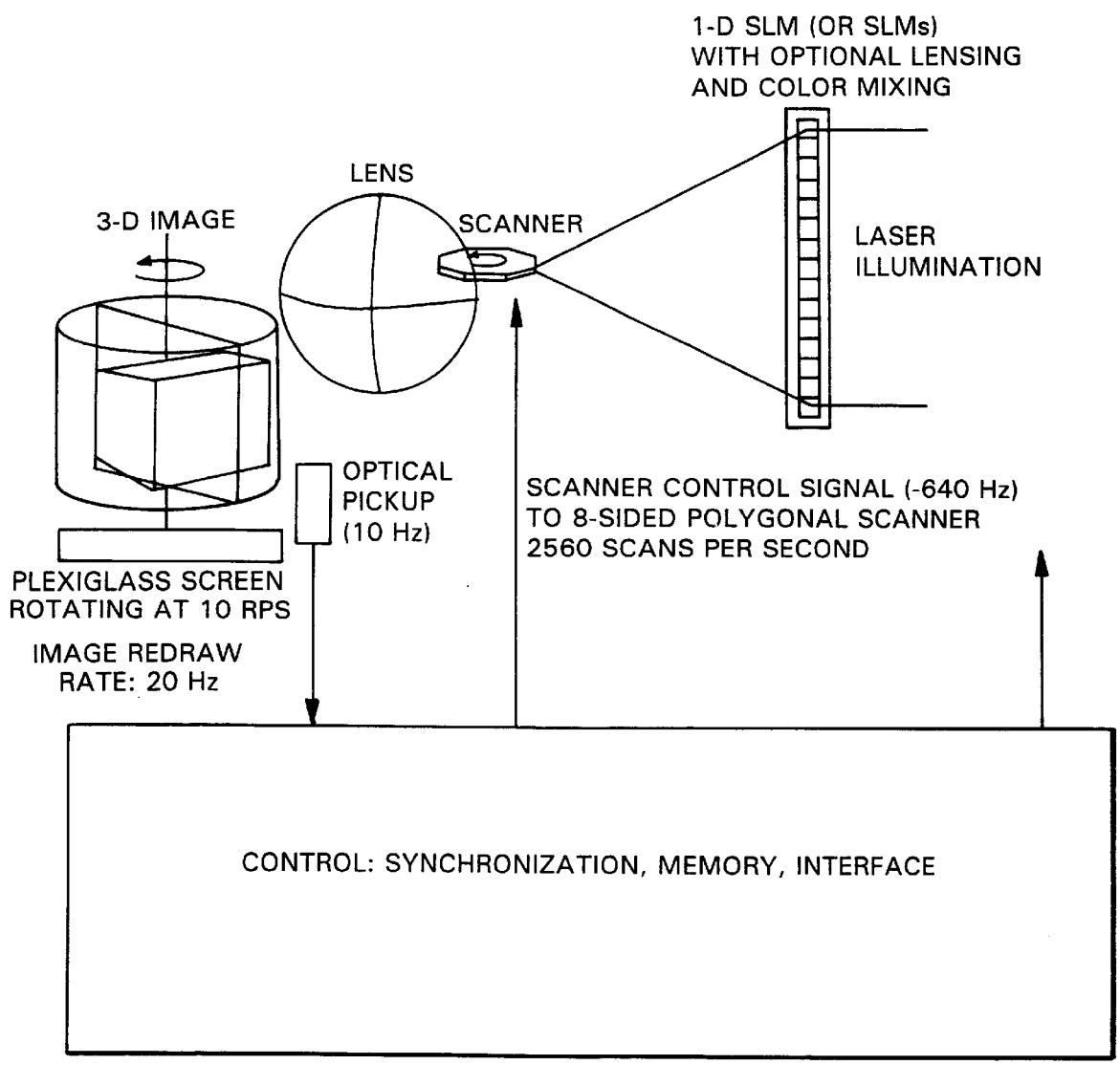
FIG. 9 shows a volumetric display system that uses raster scanning and a ganged arrangement of SLMs.

FIG. 9 illustrates the use of high-speed 1-D SLMs or light sources (such as a linear array of emitters). They may be ganged, as above, or simply used sequentially and scanned. Or, typically, one (for monochrome) or three (for multicolor) imagery may be used to perform high-speed modulation of an illumination source. The illustration depicts a single 1-D SLM which modulates laser illumination that is then scanned onto a rotating plane. Of course, this geometry may be changed to include a variety of different screen or scanning methods (for example, a vibrating mirror scanner onto a helical screen.)

The reader should understand that all references to SLMs can include 1-D SLMs, 2-D SLMs, regions of 1- or 2-D SLMs, or various other radiation emitters or modulators.

What is claimed is:

1. A display system comprising:
    a lenticular screen having a plurality of light-directing elements;
    a support assembly movably supporting the lenticular screen;
    a drive mechanism which, during operation, causes the lenticular screen to repeatedly sweep through a volume of space; and
    an image generator for concurrently projecting,
        onto a first region within a selected light-directing element, a first pixel associated with a first image, and
        onto a second region within the selected light-directing element, a second pixel associated with a second image, the first and second regions being spatially displaced from each other.

2. The display system of claim 1 wherein the lenticular screen is helical.

3. The display system of claim 1 wherein the lenticular screen is planar.

4. The display system of claim 1 wherein the light-directing elements comprise an array of cylindrically-shaped lens elements.

5. The display system of claim 1 wherein the light-directing elements comprise a two dimensional array of lens elements.

6. The display system of claim 5 wherein the lens elements of the array of lens elements are spherically shaped lenses.

7. The display system of claim 1 wherein the support assembly defines an axis of rotation for said screen.

8. The display system of claim 7 wherein said screen has an axis of symmetry and the screen is mounted in said support assembly with the axis of rotation and the axis of symmetry being collinear.

9. The display system of claim 7 wherein the drive mechanism during operation rotates said screen continually about the axis of rotation.

10. The display system of claim 1 wherein the lenticular screen is translucent.

11. The display system of claim 10 wherein the light directing elements comprise an array of lenticular elements and the lenticular screen comprises a sheet of material having a back surface and a front surface, wherein the array of lenticular elements is on only the front surface.

12. The display system of claim 11 wherein the back surface of the sheet of material is smooth.

13. The display system of claim 1 further comprising an image generator which, during operation, projects concurrent first and second images onto the lenticular screen as the lenticular screen repeatedly sweeps through said volume of space.

14. The display system of claim 13 wherein the image generator comprises an illumination source for generating light that is used for projecting the first and second pixels on the light-directing element.

15. The display system of claim 14 wherein the light generated by the illumination source is non-coherent light.

16. The display system of claim 1 wherein the drive mechanism rotates the lenticular screen.

17. The display system of claim 1, wherein the light-directing elements are selected from the group consisting of holographic optical elements, directional slats, and emissive elements.

18. A display system comprising:
   a lenticular screen that is translucent and helical in shape, the lenticular screen having a plurality of light-directing elements disposed thereon; and
   an image generator for projecting,
      onto a first region within a selected light-directing element, a first pixel associated with a first image, and
      onto a second region within the selected light-directing element, a second pixel associated with a second image, the first and second regions being spatially displaced from each other.

19. The display system of claim 18, wherein the light-directing elements comprise an array of cylindrically-shaped lens elements.

20. The display system of claim 18, wherein the light-directing elements comprise a two dimensional array of lens elements.

21. The display system of claim 19 wherein the two dimensional array of lens elements is an M by N array of lens elements wherein M and N are integers.

22. The display system of claim 21 wherein the lens elements of the array of lens elements are spherically shaped lenses.

23. The display system of claim 18 wherein the light-directing elements comprise an array of lenticular elements and the lenticular screen comprises a sheet of material having a back surface and a front surface, the array of lenticular elements being disposed only on the front surface.

24. The display system of claim 23 wherein the material of the sheet is transparent and the back surface of the sheet of material is translucent.

25. The display system of claim 23 wherein the back surface of the sheet of material is smooth.

26. The display system of claim 18, wherein the light-directing elements re selected from the group consisting of holographic optical elements, directional slats, and emissive elements.

* * * * *